Patented Jan. 12, 1943

2,307,934

UNITED STATES PATENT OFFICE 2,307,934

PREPARATION OF ALDEHYDES

Donald J. Loder and William F. Gresham, Wilmington, Del., assignors to E. I. du Pont de Nemours & Company, Wilmington, Del., a corporation of Delaware No Drawing. Application November 29, 1940, Serial No. 367,746

11 Claims. (Cl. 260—602)

This invention relates to a process for the preparation of the higher aldehydes and more particularly to the preparation of (alkoxyalkoxy) aldehydes by the oxidation of the (alkoxyalkoxy) alcohols.

An object of the present invention is to provide new compositions of matter. Another object of the invention is to provide a process for the preparation of substituted aldehydes by the air oxidation of (alkoxyalkoxy) alcohols in the presence of a suitable catalyst. A more specific object of the invention is to provide a process for the preparation of (methoxymethoxy) acetaldehyde by the air oxidation of (methoxymethoxy) ethanol in the presence of an oxidation catalyst. Other objects and advantages of the invention will hereinafter appear.

The above and other objects of the invention may be realized by passing the vaporized substituted alcohol and oxygen or air in contact, under properly controlled conditions, with an oxidation catalyst suitable for aldehyde formation. Catalysts such as silver or copper gauze, and similar well-known metallic oxidation catalysts as well as metallic silver, molybdenum and vanadium and their oxides, either promoted or not with such metals as lanthanum, thorium, neodymium, zinc, tin, and the like or their oxides may be used. Catalysts which have heretofore been found suitable for the oxidation of methanol to formaldehyde are generally suitable for the oxidation of the substituted alcohols described herein to the corresponding aldehydes.

The alcohols from which valuable aldehydes may be prepared in accord with the process of this invention may be illustrated by the empirical formula:

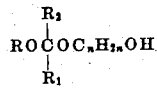

and their oxidation will give aldehydes having the empirical formula

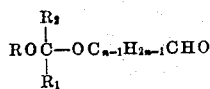

wherein R is a monovalent hydrocarbon radical, $R_1$ and $R_2$ are hydrogen or hydrocarbon radicals and $n$ is an integer greater than 1. More specific examples of these alcohols may be designated by the formula:

$$ROCH_2O(CH_2)_2OH$$

which generically represent such alcohols as (1) (methoxymethoxy) ethanol,

(2) (ethoxy methoxy) ethanol,

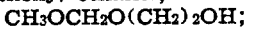

(3) (propoxy methoxy) ethanol,

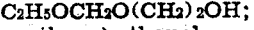

(4) (methoxy isopropoxy) ethanol,

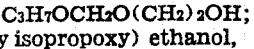

(5) (butoxy methoxy) ethanol,

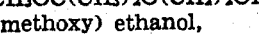

(6) (methoxy ethoxy methoxy) ethanol,

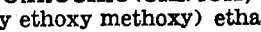

(7) (alpha-methoxy ethoxy) ethanol,

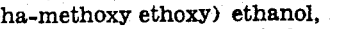

and (8) (alpha-ethoxy ethoxy), ethanol,

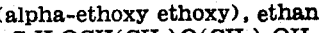

Similarly, higher substituted alcohols are included such, for example, as (9) (methoxy methoxy) propanol, $CH_3OCH_2O(CH_2)_3OH$; (10) beta-(methoxy methoxy) propanol,

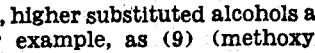

(11) (methoxy methoxy) butonal, $CH_3OCH_2O(CH_2)_4OH$; and the higher corresponding alcohols as well as their homologues. Other specific examples which may likewise be included are the mono-(methoxy methyl) ether of diethylene glycol,

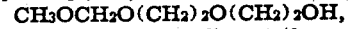

as well as the corresponding (ethoxy methyl), (propoxy methyl), (butoxy methyl), (methoxy ethoxy methyl) ethers of diethylene glycol, as well as triethylene glycol. These alcohols are prepared in accord with the process described in the copending application of Sidney Sussman, 288,587, filed August 5, 1939, which involves, primarily, the interaction of an acetal and principally formals with a polyhydric alcohol having at least one unsubstituted hydroxyl group in the presence of a suitable acidic-type catalyst such as sulfuric acid. Another class of alcohols are likewise included which are prepared by the hydrogenation of the product obtained by the process of the copending application of Donald J. Loder et al., S. N. 256,855. These alcohols have the chemical formula, $CH_2(OROR)CH_2OH$, in which R is an alkyl group.

By oxidation of the above substituted alcohols, the following aldehydes will be obtained. The numbers correspond to the above numbered alcohol which upon oxidation will produce the designated aldehyde: (1) (methoxymethoxy) acetaldehyde, $CH_3OCH_2OCH_2CHO$; (2) (ethoxymethoxy) acetaldehyde, $C_2H_5OCH_2OCH_2CHO$; (3) (propoxymethoxy) acetaldehyde, $C_3H_7OCH_2OCH_2CHO$;
(4) (methoxy isopropoxy) acetaldehyde $CH_3OC(CH_3)_2OCH_2CHO$;
(5) (butoxymethoxy) acetaldehyde, $C_4H_9OCH_2OCH_2CHO$;
(6) (methoxyethoxy methoxy) acetaldehyde, $CH_3O(CH_2)_2OCH_2OCH_2CHO$;
(7) (alphamethoxyethoxy) acetaldehyde, $CH_3OCH(CH_3)OCH_2CHO$;
(8) (alpha ethoxyethoxy) acetaldehyde, $C_2H_5OCH(CH_3)OCH_2CHO$;
(9) methoxy methoxy propanal, $CH_3OCH_2OC_2H_4CHO$;
(10) beta-(methoxymethoxy) propanal $CH_3OCH_2OCH(CH_3)CHO$;
(11) (methoxymethoxy) butanal, $CH_3OCH_2OC_3H_6CHO$.

The oxidation may be conducted with pure oxygen or air and preferably the latter, although the oxygen may, in lieu of being diluted with nitrogen, be diluted with any other suitable inert gas or vapor. Generally the gaseous mixture being reacted should contain in the order of from 1% to 65% of the alcohol, 0.9 to 9.0% oxygen and from 30 to 97.5% of an inert gas such as nitrogen.

For the oxidation of the more easily decomposible alcohols and those alcohols which give more easily decomposible aldehydes it has been found that no more oxygen should be present than is required stoichiometrically to convert from 15 to 75% of the alcohol to the aldehyde and preferably no more than would be required stoichiometrically to convert from 20 to 30% of the alcohol to the aldehyde. When processing the gaseous mixtures of such compositions the temperature of the reaction should range preferably between 100 and 600° C. and if desired pressures may be used ranging from 0.1 to 2 atmospheres.

Examples are given to illustrate preferred embodiments of the invention, but it will be understood that the invention is not restricted to the particular details thereof. Parts are by weight unless otherwise stated.

*Example 1.*—Into a Pyrex glass converter containing a silver gauze catalyst, provided with a preheater all disposed in an electrically heated furnace was passed (methoxymethoxy) ethanol (212 parts) at 895 space velocity, oxygen at 1290 and nitrogen at 19000 space velocity. With a furnace temperature of 330–340° C. the oxidation temperature was maintained at 418–423° C. The product amounted to 201 parts of a colorless liquid which contained 72.8 parts of (methoxymethoxy) acetaldehyde which is a colorless liquid boiling at 135° C.

*Example 2.*—The process of Example 1 was repeated using a gaseous mixture containing (methoxymethoxy) ethanol, oxygen and nitrogen in the molar ratios of 2:1:19. The mixture was passed over the silver gauze catalyst at approximately 432° C. with a 0.15 second contact time (time of contact may range between 0.075 to 0.4 second). Distillation of the product gave (methoxymethoxy) acetaldehyde in 26.3% yield.

Aldehydes obtained in accord with the invention have many important uses. They may be condensed with themselves to form intermediates, condensed with urea or with phenols to form urea-aldehyde or phenol-aldehyde resins. They are suitable for the preparation of many of the resins, plasticizers, softeners, and elasticizers which are made by the reaction of the aldehyde with other organic compounds such as the amines and phenols.

From a consideration of the above description it will be appreciated that many changes may be made therein without departing from the scope of the invention.

We claim:

1. A process for the preparation of alkoxy substituted aldehydes which comprises oxidizing an alcohol in accord with the following equation:

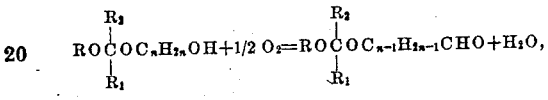

wherein R is a lower alkyl radical and $R_1$ and $R_2$ are selected from the group consisting of hydrogen and lower alkyl radicals and $n$ is an integer.

2. The process of claim 1 conducted at a temperature between 100 and 600° C. and in the presence of an oxidation catalyst.

3. The process of claim 1 conducted in the presence of from 15 to 75% of the stoichiometrical amount of oxygen required to convert the alcohol to aldehyde.

4. The process of claim 1 conducted in the presence of from 20 to 30% of the stoichiometrical amount of oxygen required to convert the alcohol to aldehyde.

5. A process for the preparation of an aldehyde having the empirical formula: $ROCH_2OCH_2CHO$, from alcohols having the empirical formula $ROCH_2O(CH_2)_2OH$, in which R is a monovalent hydrocarbon radical, which comprises subjecting the alcohol to vapor phase oxidation at a temperature between 100 and 600° C. and in the presence of an oxidation catalyst.

6. A process for the preparation of methoxymethoxy acetaldehyde which comprises oxidizing in the vapor phase (methoxymethoxy) ethanol at a temperature between 100 and 600° C. and in the presence of an oxidation catalyst.

7. A process for the preparation of ethoxymethoxy acetaldehyde which comprises oxidizing in the vapor phase (ethoxymethoxy) ethanol at a temperature between 100 and 600° C. and in the presence of an oxidation catalyst.

8. A process for the preparation of propoxymethoxy acetaldehyde which comprises oxidizing in the vapor phase (propoxymethoxy) ethanol at a temperature between 100 and 600° C. in the presence of an oxidation catalyst.

9. The process for the preparation of (methoxymethoxy) ethanol which comprises passing (methoxymethoxy) ethanol, oxygen, and nitrogen at space velocities of approximately 895, 1290, and 19,000 respectively over a silver gauze catalyst at a temperature between 418–423° C.

10. An (alkoxy methoxy) acetaldehyde having the formula $ROCH_2OCH_2CHO$, wherein R is an alkyl group.

11. (Methoxymethoxy) acetaldehyde having a boiling point of approximately 135° C. and the formula $CH_3OCH_2OCH_2CHO$.

DONALD J. LODER.
WILLIAM F. GRESHAM.